(12) United States Patent
Higashikawa

(10) Patent No.: US 11,072,154 B2
(45) Date of Patent: Jul. 27, 2021

(54) DECORATIVE MATERIAL

(71) Applicant: TOPPAN PRINTING CO., LTD., Tokyo (JP)

(72) Inventor: Eiichi Higashikawa, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 69 days.

(21) Appl. No.: 16/417,229

(22) Filed: May 20, 2019

(65) Prior Publication Data

US 2019/0270292 A1 Sep. 5, 2019

Related U.S. Application Data

(63) Continuation of application No. PCT/JP2017/046210, filed on Dec. 22, 2017.

(30) Foreign Application Priority Data

Dec. 22, 2016 (JP) .............................. JP2016-249384

(51) Int. Cl.
*B32B 33/00* (2006.01)
*B05D 5/06* (2006.01)
(Continued)

(52) U.S. Cl.
CPC ............... *B32B 33/00* (2013.01); *B05D 5/06* (2013.01); *B32B 27/00* (2013.01); *B32B 27/30* (2013.01);
(Continued)

(58) Field of Classification Search
CPC ........ B32B 2307/406; B32B 2307/408; B32B 2307/40; B32B 33/00; B32B 2307/584;
(Continued)

(56) References Cited

U.S. PATENT DOCUMENTS

| 2003/0113520 A1* | 6/2003 | Takahashi ................. B44F 9/02 428/201 |
| 2008/0070005 A1* | 3/2008 | Kobayashi .............. B32B 27/18 428/161 |
| 2017/0095996 A1 | 4/2017 | Kataoka et al. |

FOREIGN PATENT DOCUMENTS

| CN | 106103086 A | 11/2016 |
| JP | 2001-315286 A | 11/2001 |

(Continued)

OTHER PUBLICATIONS

International Searching Authority, "International Search Report," issued in connection with International Patent Application No. PCT/JP2017/046210, dated Mar. 6, 2018.

(Continued)

*Primary Examiner* — Alicia J Sawdon
(74) *Attorney, Agent, or Firm* — Foley & Lardner LLP

(57) ABSTRACT

A decorative material that has higher scratch resistance while preventing defects generated during lamination of a gloss-adjusting layer. In a decorative material according to an embodiment of the present invention, a resin component that constitutes a first gloss-adjusting layer is a mixture of a urethane-based thermosetting resin having a polyol and an isocyanate, and an ionizing radiation-curable resin having an acrylic group or a methacrylic group; and the urethane-based thermosetting resin is contained in an amount within a range of 3 parts by mass or more and 100 parts by mass or less relative to 100 parts by mass of the ionizing radiation-curable resin.

9 Claims, 1 Drawing Sheet

(51) Int. Cl.
*B32B 27/30* (2006.01)
*B32B 27/40* (2006.01)
*B41M 3/06* (2006.01)
*B44F 7/00* (2006.01)
*B32B 27/00* (2006.01)
*B44F 9/02* (2006.01)
*B44F 9/04* (2006.01)
*B32B 7/023* (2019.01)
*B32B 3/10* (2006.01)

(52) U.S. Cl.
CPC .............. *B32B 27/40* (2013.01); *B41M 3/06* (2013.01); *B44F 7/00* (2013.01); *B44F 9/02* (2013.01); *B44F 9/04* (2013.01); *B32B 3/10* (2013.01); *B32B 7/023* (2019.01); *B32B 2255/28* (2013.01)

(58) Field of Classification Search
CPC ...... B32B 2307/4023; B44F 1/02; B44F 7/00; B44F 5/00
See application file for complete search history.

(56) References Cited

FOREIGN PATENT DOCUMENTS

| | | |
|---|---|---|
| JP | 3629964 B2 | 3/2005 |
| JP | 2014-188742 A | 10/2014 |
| JP | 2015-208875 A | 11/2015 |
| WO | WO-2008/078687 A | 7/2008 |

OTHER PUBLICATIONS

International Searching Authority, "Written Opinion," issued in connection with International Patent Application No. PCT/JP2017/046210, dated Mar. 6, 2018.

Extended European Search Report dated Nov. 8, 2019 for corresponding Application No. 17885429.5.

Office Action dated Feb. 2, 2021 for corresponding Chinese Patent Application No. 201780078269.3.

* cited by examiner

DECORATIVE MATERIAL

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2017/046210, filed on Dec. 22, 2017, which is based upon and claims the benefit of priority to Japanese Patent Application No. 2016-249384, filed on Dec. 22, 2016; the disclosures of which are incorporated herein by reference in their entireties.

TECHNICAL FIELD

The present invention relates to a decorative material for use in interior and exterior finishes of buildings, and surface decoration of fittings, furniture, etc.

BACKGROUND ART

Conventionally, desired design patterns, such as wood grain patterns and stone grain patterns, have generally been applied to decorative materials for use in, for example, interior and exterior finishes of buildings, and surface decoration of fittings, furniture, etc. Moreover, decorative materials that not only two-dimensionally express design patterns, such as wood grain patterns and stone grain patterns, but also three-dimensionally express the feeling of unevenness of the surface of natural wood materials or stone materials, have also been widely used mainly for applications for which a high-grade feeling is desired.

As a method for expressing a feeling of three-dimensional unevenness together with a two-dimensional design pattern on the surface of decorative materials, various methods have been conventionally devised, and separately used depending on the purpose. In particular, there is a method for visually expressing three-dimensional unevenness by taking advantage of optical illusions by changing the surface gloss state (specifically glossiness) of portions to be expressed as recesses or projections, rather than actually forming unevenness on the surface of the decorative material. According to this method, even if there is actually no unevenness, the human eye recognizes portions with higher gloss as projections, and portions with lower gloss as recesses.

Specifically, for example, a transparent or translucent synthetic coating material layer with lower gloss is formed on the entire print surface of a substrate on which suitable patterns, including a recessed pattern, are printed. Then, a transparent or translucent synthetic coating material layer with higher gloss is formed on portions of the surface of the formed synthetic coating material layer other than portions corresponding to the recessed pattern. Of course, a decorative material in which the unevenness relationship is reversed can be obtained by reversing the height relationship of gloss.

This method does not require special chemicals etc., and can easily impart a feeling of three-dimensional unevenness to any substrates only by preparing two types of coating materials with different glosses. In addition, synthetic coating material layers with different glosses can be formed by a known printing method, such as a gravure printing method, after the formation of a design pattern (a pattern ink layer); thus, special facilities are not required, production efficiency is high, and synchronization with the design pattern is easy. Moreover, the thickness of the synthetic coating material layer is much less than the height difference of unevenness to be expressed; thus, the amount of resin used can be reduced, there is an advantage in terms of flexibility, and a decorative material having excellent bending processability can be easily obtained. There is another advantage that contaminants do not remain in recesses because there are no large asperities on the surface of the decorative material.

In consideration of these many advantages, decorative materials using this method have already been frequently used; however, in terms of high-grade feeling, there are no methods better than methods for actually forming unevenness. The reason for this is considered to be as follows. For example, a mechanical embossing method can faithfully reproduce unevenness, such as natural wood vessels, including the cross-sectional shape of the vessels etc. In contrast, in this method using two types of coating materials with different glosses, the surface has two variations of glosses; thus, two variations of unevenness are expressed. Accordingly, there is a problem that it is difficult to express unevenness having an inclined portion with continuously varying depth (height), such as natural wood vessels.

In light of the above, there have recently been proposals for decorative materials that can express unevenness having an inclined portion, such as natural wood vessels, by providing a synthetic coating material layer that expresses unevenness having an inclined portion with continuously varying depth (hereinafter also referred to as a "gloss-adjusting layer") (see, for example, PTL 1).

CITATION LIST

Patent Literature

PTL 1: JP 3629964 B2

Here, as a general method for adjusting the gloss of the gloss-adjusting layer, a gloss-adjusting agent (a matting agent) is added to a transparent resin, which is used as a binder. Fine particles of an inorganic material or organic material are mainly used as gloss-adjusting agents. In particular, inorganic material fine particles (particularly silica fine particles) have high matting ability and are widely used. Due to the addition of a gloss-adjusting agent, the gloss-adjusting agent imparts unevenness to the surface of the gloss-adjusting layer, and light is scattered on the uneven surface, thereby obtaining a matting effect. Desired gloss can be freely obtained by controlling the type and amount of such a gloss-adjusting agent.

As the transparent resin used for a binder, urethane-based resins using at least one polyol and at least one isocyanate are often used in terms of workability, price, the cohesive force of the resin itself, etc. Urethane-based resins are characterized in that their characteristics can be variously controlled depending on the combination of polyols and isocyanates. Polyols and isocyanates each have a relatively large molecular weight and a small number of functional groups per molecule; thus, there is a problem that it is generally difficult to increase crosslinking density. Because crosslinking density is a parameter that particularly has great influence on scratch resistance, it is theoretically difficult for urethane-based resins to satisfy demands for high scratch resistance, e.g., scratch resistance required for horizontal surfaces of top boards, shelf boards, etc., of furniture.

Further, in the case of a gloss-adjusting layer using the above matting agent, projections on the surface are scraped, or the matting agent is removed, thereby resulting in less scratch resistance. Because the deterioration tendency of scratch resistance is substantially proportional to the amount of the matting agent, decorative materials with less gloss and high-grade design have more difficulty satisfying the scratch resistance required for the horizontal surfaces mentioned above.

In contrast, an ionizing radiation-curable resin having an acrylic group and a methacrylic group, which can be used as a transparent resin, has a relatively low molecular weight and a large number of functional groups per molecule, and thus has high crosslinking density. Accordingly, it can be said that this resin is highly likely to improve scratch resistance. When such an ionizing radiation-curable resin is used as a transparent resin, a decorative material having high scratch resistance can be provided. The scratch resistance of a decorative material mainly depends on the strength of the uppermost surface thereof; thus, an ionizing radiation-curable resin may be actively used only for the constituent material of the uppermost surface layer.

Here, in the case of a decorative material comprising two gloss-adjusting layers, where the lower gloss-adjusting layer covers the entire surface of the decorative material, and the upper gloss-adjusting layer covers only part of the decorative material, the lower gloss-adjusting layer is also exposed to the surface; thus, in order to produce a decorative material having high scratch resistance, it is essential to use an ionizing radiation-curable resin as a transparent resin for both gloss-adjusting layers. However, ionizing radiation-curable resins are not cured without ionizing radiation. In the case of processing with various printers generally used for the production of decorative materials, an upper gloss-adjusting layer is laminated on a lower gloss-adjusting layer, which is uncured, thereby causing defects, such as dissolution and scraping of the lower gloss-adjusting layer.

SUMMARY OF THE INVENTION

Technical Problem

In order to improve or solve the above problems, an object of the present invention is to provide a decorative material having higher or even high scratch resistance while preventing defects generated during lamination of a gloss-adjusting layer.

As a result of extensive research, the inventors of the present invention found that a decorative material having higher or even high scratch resistance while preventing defects generated during lamination of a gloss-adjusting layer can be provided by using, as a resin component of the gloss-adjusting layer on the substrate side, a dual-curing type resin component combining a urethane-based thermosetting resin and an ionizing radiation-curable resin, and by setting the amount of the urethane-based thermosetting resin within an optimal range.

In order to achieve the above object, one embodiment of the present invention is a decorative material comprising a first gloss-adjusting layer provided on a substrate, and a second gloss-adjusting layer partially provided on the first gloss-adjusting layer, and having gloss that is different from that of the first gloss-adjusting layer; wherein a resin component that constitutes the first gloss-adjusting layer is a mixture of a urethane-based thermosetting resin having a polyol and an isocyanate, and an ionizing radiation-curable resin having an acrylic group or a methacrylic group; and the urethane-based thermosetting resin is contained in an amount within a range of 3 parts by mass or more and 100 parts by mass or less relative to 100 parts by mass of the ionizing radiation-curable resin.

Advantageous Effects of the Invention

According to the present invention, a mixture of a urethane-based thermosetting resin and an ionizing radiation-curable resin is used as a resin component of a first gloss-adjusting layer, and the amount of the urethane-based thermosetting resin added is set within an optimal range, thereby providing a decorative material having higher or even high scratch resistance while preventing defects during lamination of the first gloss-adjusting layer.

DESCRIPTION OF REPRESENTATIVE EMBODIMENTS

Figure 1:
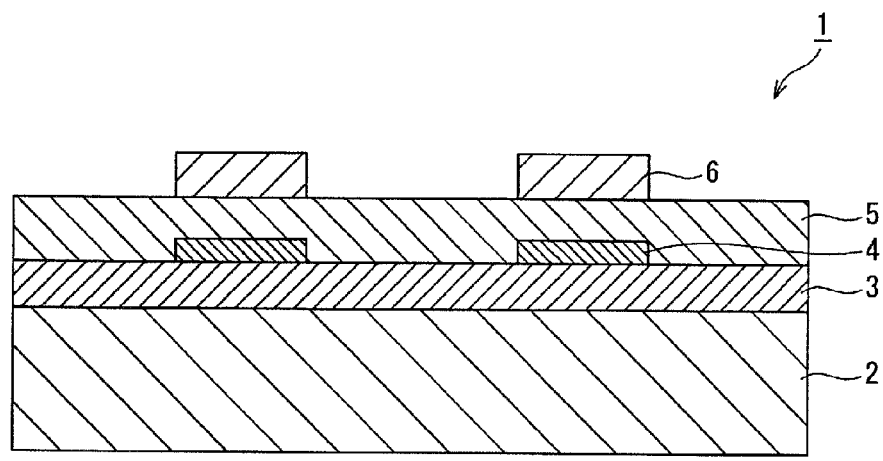
FIG. 1 is a cross-sectional view showing a decorative material according to an embodiment.

With reference to the drawings, a description will now be given of representative embodiments according to the present invention. The present invention is not limited to the following representative embodiments, and appropriate modifications can be made without departing from the spirit of the present invention. The representative embodiments described below are merely examples of the present invention, and the design thereof could be appropriately changed by one skilled in the art. Here, the drawings are schematic, and the relationship between thickness and plane size, the ratio of the thickness of each layer, etc., are different from actual ones. The embodiments described below are merely examples of the configurations for embodying the technical idea of the present invention, and the technical idea of the present invention should not limit the materials, shapes, structures, and the like of the components to those described below. The technical idea of the present invention can be modified in various ways within the technical scope specified by the claims.

The same constituent elements are denoted by the same reference numerals unless there is a reason for the sake of convenience, and redundant description is omitted. In the drawings referred to in the following description, for clarity, characteristic parts are enlarged, and thus the components are not shown to scale. It is, however, clear that one or more embodiments can be implemented without such details. In addition, known structures and devices may be schematically represented for simplicity.

A decorative material 1 according to an embodiment of the present invention is described with reference to the drawings.

Here, the drawings are schematic, and the relationship between thickness and planar size, the ratio of the thickness of each layer, etc., are different from actual ones. Moreover, the embodiments shown below merely exemplify the structure for embodying the technical idea of the present invention, and the technical idea of the present invention does not limit the materials, shapes, structures, etc., of component parts to those described below. The technical idea of the present invention can be modified in various ways within the technical scope specified by the claims.

(Structure)

As shown in FIG. 1, the decorative material 1 according to the present embodiment comprises a first gloss-adjusting layer 5 provided on a substrate 2, and a second gloss-adjusting layer 6 partially provided on the first gloss-adjusting layer 5, and having gloss different from that of the first gloss-adjusting layer 5. It is important that, of these first and second gloss-adjusting layers 5 and 6, the transparent resin used in the first gloss-adjusting layer 5 is a mixture of a two-part urethane-based thermosetting resin comprising at least one polyol and at least one isocyanate, and an ionizing radiation-curable resin having an acrylic group or a methacrylic group; and that the mixing ratio of the thermosetting resin is within a range of 3 parts by mass or more and 100 parts by mass or less relative to 100 parts by mass of the ionizing radiation-curable resin. A decorative material 1 having high scratch resistance while preventing defects during lamination can be thereby provided.

Other layers, such as a base solid ink layer 3, a pattern ink layer 4, and a transparent resin layer (not shown), may be disposed between the substrate 2 and the first gloss-adjusting layer 5, as described later.

(Substrate)

The substrate 2 is not limited, as long as it is usable as base paper for the decorative material 1. Examples thereof include paper, such as thin paper, resin-mixed paper, titanium paper, resin-impregnated paper, flame-resistant paper, and inorganic paper; woven fabrics or non-woven fabrics made of natural fibers or synthetic fibers; synthetic resin-based substrates comprising homo or random polypropylene resins, polyolefin resins such as polyethylene resin, copolymerized polyester resins, crystalline polyester resins in an amorphous state, polyethylene naphthalate resins, polybutylene resins, acrylic resins, polyamide resins, polycarbonate resins, polyvinyl chloride resins, polyvinylidene chloride resins, fluororesins, etc.; wooden substrates, such as wood veneer, sliced veneer, plywood, laminate lumber, particle board, and medium density fiberboard; inorganic substrates, such as gypsum plates, cement plates, calcium silicate plates, and pottery plates; metal-based substrates, such as iron, copper, aluminum, and stainless steel; composite materials and laminates thereof; and other conventionally known materials. Moreover, the shape of the substrate 2 can be a film shape, a sheet shape, a plate shape, a profile molded article, or the like.

(Base Solid Ink Layer)

The base solid ink layer 3 is provided between the substrate 2 and the pattern ink layer 4, and is a layer covering the entire surface of the substrate 2 on the first gloss-adjusting layer 5 side, depending on the desired design. Moreover, the base solid ink layer 3 may be a multilayer of two or more layers, if necessary, to achieve masking properties etc. Furthermore, the pattern ink layer 4 may be formed by laminating as many layers as necessary for expression of the desired design. Thus, the base ink layer 3 can be combined with the pattern ink layer 4 in various ways depending on the desired design, i.e., design to be expressed by the combination; however, they are not limited.

The constituent material of the base solid ink layer 3 is not limited. For example, printing ink in which a matrix and a coloring agent, such as dye or pigment, are dissolved and dispersed in a solvent, or a coating agent, can be used. Examples of the matrix include various synthetic resins, such as oily nitrocellulose resin, two-component urethane resin, acrylic-based resin, styrene-based resin, polyester-based resin, urethane-based resin, polyvinyl-based resin, alkyd resin, epoxy-based resin, melamine-based resin, fluororesin, silicone-based resin, and rubber-based resin; mixtures thereof, copolymers thereof, etc. Further, examples of the coloring agent include inorganic pigments, such as carbon black, titanium white, zinc white, rouge, chrome yellow, Prussian blue, and cadmium red; organic pigments, such as azo pigments, lake pigments, anthraquinone pigments, phthalocyanine pigments, isoindolinone pigments, and dioxazine pigments; and mixtures thereof. Moreover, examples of the solvent include toluene, xylene, ethyl acetate, butyl acetate, methyl alcohol, ethyl alcohol, isopropyl alcohol, acetone, methyl ethyl ketone, methyl isobutyl ketone, cyclohexanone, water, and mixtures thereof.

Further, in order to impart various functions, functional additives, such as an extender pigment, a plasticizer, a dispersant, a surfactant, a tackifier, an adhesive aid, a drying agent, a curing agent, a curing accelerator, and a curing retarder, may be added to the base solid ink layer 3.

Each of the base solid ink layer 3, and the pattern ink layer 4 and the first and second gloss-adjusting layers 5 and 6, which are described later, can be formed by various printing methods, such as a gravure printing method, an offset printing method, a screen printing method, an electrostatic printing method, and an ink-jet printing method. Moreover, because the base solid ink layer 3 and the first gloss-adjusting layer 5 cover the entire surface of the substrate 2 on the first gloss-adjusting layer 5 side, they can be formed by various coating methods, such as a roll coating method, a knife coating method, a microgravure coating method, and a die coating method. These printing methods and coating methods may be selected separately depending on the layer to be formed, or the same method may be selected to carry out combined processing.

(Pattern Ink Layer)

The pattern ink layer 4 is provided between the substrate 2 and the first gloss-adjusting layer 5, and is a layer for adding a design pattern to the decorative material 1. Examples of the design pattern include wood grain patterns, stone grain patterns, sand patterns, tiling patterns, brick patterns, fabric patterns, grain leather patterns, geometric patterns, and the like. The pattern ink layer 4 is formed only in a region directly below the second gloss-adjusting layer 6. In other words, the second gloss-adjusting layer 6 is formed only in a region of the first gloss-adjusting layer 5 overlapping the pattern ink layer 4. Moreover, the design pattern of the pattern ink layer 4 is synchronized with the gloss of the second gloss-adjusting layer 6. The designability due to the second gloss-adjusting layer 6 can be thereby added to the designability due to the pattern ink layer 4. Therefore, a decorative material 1 that has a high-grade design expression close to natural wood or natural stone can be formed.

The present embodiment shows an example in which the second gloss-adjusting layer 6 is formed only in a region of the first gloss-adjusting layer 5 overlapping the pattern ink layer 4, that is, the second gloss-adjusting layer 6 is formed only in a region of the first gloss-adjusting layer 5 directly above the pattern ink layer 4; however, other structures can also be employed. For example, the second gloss-adjusting layer 6 may be formed in a region of the first gloss-adjusting layer 5 overlapping the pattern ink layer 4; in addition to the region directly above the pattern ink layer 4, the second gloss-adjusting layer 6 may be formed partly in regions of the first gloss-adjusting layer 5 other than the region right above. That is, the second gloss-adjusting layer 6 may be formed so that at least a portion thereof overlaps the pattern ink layer 4. Moreover, the second gloss-adjusting layer 6 may be integrally formed in a region directly above the pattern ink layer 4 and partial regions other than the region directly above the pattern ink layer 4.

The constituent material of the pattern ink layer 4 is not limited. For example, as with the base solid ink layer 3, printing ink in which a matrix and a coloring agent, such as dye or pigment, are dissolved and dispersed in a solvent, or a coating agent, can be used. Further, in order to impart various functions, for example, functional additives, such as an extender pigment, a plasticizer, a dispersant, a surfactant, a tackifier, an adhesive aid, a drying agent, a curing agent, a curing accelerator, and a curing retarder, may be added to the pattern ink layer 4.

(First and Second Gloss-Adjusting Layers)

The first gloss-adjusting layer 5 is provided on the surface of the base solid ink layer 3 and the pattern ink layer 4 on the first gloss-adjusting layer 5 side, and is a layer for adjusting the gloss state of the surface of the decorative material 1. The first gloss-adjusting layer 5 is formed on the entire surface of the base solid ink layer 3 and the pattern ink layer 4 on the first gloss-adjusting layer 5 side, and covers the entire surface of the substrate 2 on the first gloss-adjusting layer 5 side. Moreover, the second gloss-adjusting layer 6 is provided on the surface of the first gloss-adjusting layer 5 on the second gloss-adjusting layer 6 side, has gloss different from that of the first gloss-adjusting layer 5, and is a layer for adjusting the gloss state of the surface of the decorative material 1. The second gloss-adjusting layer 6 is formed in part of the surface of the first gloss-adjusting layer 5 on the second gloss-adjusting layer 6 side. Unevenness can be expressed due to the difference in gloss between the first and second gloss-adjusting layers 5 and 6.

Of the first and second gloss-adjusting layers 5 and 6, a matting agent is added to the one with lower gloss. The amount of the matting agent is preferably 5 parts by mass or more and 40 parts by mass or less relative to 100 parts by mass of the resin composition. The amount of the matting agent is more preferably 10 parts by mass or more and 30 parts by mass or less. If the amount of the matting agent is less than 5 parts by mass, the matting effect is insufficient; thus, the gloss difference from the gloss-adjusting layer with higher gloss is reduced, so that the feeling of unevenness is insufficient. In contrast, if the amount of the matting agent is larger than 40 parts by mass, the resin composition is insufficient with respect to the amount of the matting agent, thereby resulting in the removal of the matting agent, and reduction in scratch resistance due to the removal of the matting agent, so that the durability required for the decorative material 1 is severely impaired.

It is also possible to add any matting agent to the gloss-adjusting layer with higher gloss. These should be suitably adjusted according to the final feeling of unevenness and designability. The matting agent and the resin composition used in the first and second gloss-adjusting layers 5 and 6 may be the same or different. These can be freely selected depending on the feeling of unevenness and various characteristics demanded.

As the matting agent, a commercially available known matting agent can be used. For example, fine particles of an inorganic material, such as silica, glass, alumina, calcium carbonate, barium sulfate, or acrylic, can be used. Because the first and second gloss-adjusting layers 5 and 6 are required to have high transparency, it is particularly preferable to use fine particles of silica, glass, or acrylic, which have high transparency. In particular, among silica fine particles, a matting agent with a low bulk density in which fine primary particles undergo secondary aggregation has a higher matting effect relative to the addition amount, than solid spherical particles. Thus, a gloss-adjusting layer with lower gloss can be formed using such a matting agent. Accordingly, the difference in gloss between the first gloss-adjusting layer 5 and the second gloss-adjusting layer 6 can be increased, and the feeling of unevenness to be obtained can be enhanced. An excellent design expression of greater depth can be thereby achieved.

The particle diameter of the matting agent can be any numerical value; however, when a known matting agent is used, the particle diameter thereof is preferably 2 µm or more and 15 µm or less. The particle diameter is more preferably 4 µm or more and 12 µm or less. Because a matting agent having a particle diameter of less than 2 µm has a low matting effect, a feeling of unevenness due to the difference in gloss cannot be sufficiently obtained. Moreover, a matting agent having a particle diameter of larger than 15 µm leads to too strong light scattering, which causes cloudiness of the first and second gloss-adjusting layers 5 and 6, and increases visual particle recognition; thus, the feeling of unevenness due to the difference in gloss is rather impaired.

As the resin part (resin composition) that constitutes the first gloss-adjusting layer 5, it is important to use a mixture of a two-part urethane-based thermosetting resin comprising at least one polyol and at least one isocyanate, and an ionizing radiation-curable resin having an acrylic group or a methacrylic group. Examples of the polyol include acrylic polyol, polycarbonate polyol, polyester polyol, and the like. Examples of the isocyanate include curing agents, such as adduct products, biuret products, and isocyanurate products, which are derivatives of tolylene diisocyanate (TDI), xylylene diisocyanate (XDI), hexamethylene diisocyanate (HMDI), diphenylmethane diisocyanate (MDI), lysine diisocyanate (LDI), isophorone diisocyanate (IPDI), methylhexane diisocyanate (HTDI), bis(isocyanatomethyl)cyclohexane (HXDI), trimethylhexamethylene diisocyanate (TMDI), etc.

As the ionizing radiation-curable resin having an acrylic group or a methacrylic group, it is preferable to use a polyfunctional (meth)acrylate monomer or oligomer having a number average molecular weight of 300 or more and 5000 or less, and a functional group number or average functional group number of 4 or more and 15 or less. Within this range, the degree of crosslinking of the resin component in the gloss-adjusting layer can be sufficiently increased; thus, higher scratch resistance can be exhibited. It is more preferable to use a polyfunctional (meth)acrylate monomer having a number average molecular weight of 300 or more and 1500 or less, and a functional group number or average functional group number of 4 or more and 8 or less. Within this range, the viscosity of the ionizing radiation-curable resin itself can be reduced; thus, when ink for forming a gloss-adjusting layer is prepared, the solids concentration can be increased with the same viscosity, and the stability of the ink itself and the coating state can be improved. Moreover, examples of polyfunctional (meth)acrylate monomers include pentaerythritol tetra(meth)acrylate (PET4A) and derivatives thereof, ditrimethylolpropane tetra(meth)acrylate and derivatives thereof, dipentaerythritol penta(meth)acrylate (DPPA), and derivatives thereof, and dipentaerythritol hexa(meth)acrylate (DPHA) and derivatives thereof.

The method for measuring the number average molecular weight of the ionizing radiation-curable resin is not limited; however, gel permeation chromatography (GPC) is preferably used. Although the GPC measuring device is not limited, the filler of the GPC column is preferably a polystyrene gel, and tetrahydrofuran (THF) is preferably used as an eluent. A polystyrene polymer may be used as a standard substance for GPC. Because the above polyfunctional (meth) acrylate monomer is constituted as a single substance, when the structure thereof is known, the number average molecular weight may be a value determined from the structural formula.

Moreover, in order to exhibit the effects of the present invention, it is important that, in the resin component (resin composition) that constitutes the first gloss-adjusting layer 5, the urethane-based thermosetting resin is contained in an amount of 3 parts by mass or more and 100 parts by mass or less relative to 100 parts by mass of the ionizing radiation-curable resin. Further, the amount of the urethane-based thermosetting resin is preferably 10 parts by mass or more and 50 parts by mass or less. If the amount of the urethane-based thermosetting resin is less than 3 parts by mass, the ratio of the urethane-based thermosetting resin is too low; thus, defects, such as dissolution and scraping of the first gloss-adjusting layer 5 during lamination of the second gloss-adjusting layer 6, are more likely to occur. If the amount of the urethane-based thermosetting resin exceeds 100 parts by mass, the ratio of the urethane-based thermosetting resin is too high; thus, the degree of crosslinking of the resin composition is reduced, and the scratch resistance of the first gloss-adjusting layer 5 is significantly reduced. Because the amount of the urethane-based thermosetting resin is set to 3 parts by mass or more and 100 parts by mass or less relative to 100 parts by mass of the ionizing radiation-curable resin, when the resin component of the first gloss-adjusting layer 5 is dried after coating, the urethane-based thermosetting resin that constitutes the resin component can be cured, and defects, such as dissolution and scraping of the first gloss-adjusting layer 5 during lamination of the second gloss-adjusting layer 6, can be prevented. Moreover, the ionizing radiation-curable resin that constitutes the resin component can be cured by ionizing radiation after production of the decorative material 1, and the scratch resistance of the first gloss-adjusting layer 5 can be improved. Furthermore, because the amount of the urethane-based thermosetting resin is set to 10 parts by mass or more and 50 parts by mass or less relative to 100 parts by mass of the ionizing radiation-curable resin, avoidance of defects during lamination of the second gloss-adjusting layer 6, and higher scratch resistance of the first gloss-adjusting layer 5 can be both achieved.

As the resin part (resin composition) that constitutes the second gloss-adjusting layer 6, it is important to use a resin containing an ionizing radiation-curable resin having an acrylic group or a methacrylic group. Further, when an improvement of workability (cracking prevention) is required, a mixture of a two-part urethane-based thermosetting resin comprising at least one polyol and at least one isocyanate, and an ionizing radiation-curable resin having an acrylic group or a methacrylic group can be used as the resin part (resin composition) that constitutes the second gloss-adjusting layer 6. In this case, it is important that in the resin component (resin composition) that constitutes the second gloss-adjusting layer 6, the amount of the urethane-based thermosetting resin is 25 parts by mass or less relative to 100 parts by mass of the ionizing radiation-curable resin. If the amount of the urethane-based thermosetting resin exceeds 25 parts by mass, the ratio of the urethane-based thermosetting resin is too high; thus, the degree of crosslinking of the resin composition is reduced, and the scratch resistance of the second gloss-adjusting layer 6 is significantly reduced. The lower limit of the amount of the urethane-based thermosetting resin is 3 parts by mass. If the lower limit is less than 3 parts by mass, there is no practical problem in terms of scratch resistance; however, when the decorative material 1 is required to have workability (cracking prevention), the required characteristic cannot be satisfied.

Because the amount of the urethane-based thermosetting resin in the second gloss-adjusting layer 6 is set to 25 parts by mass or less, when ionizing radiation is applied after production of the decorative material 1, the ionizing radiation-curable resin that constitutes the resin component can be sufficiently cured, and the scratch resistance of the second gloss-adjusting layer 6 can be improved.

The thickness of the first and second gloss-adjusting layers 5 and 6 can be any numerical value. However, the average particle diameter of the matting agent is preferably 2 µm or more and 15 µm or less, as described above; thus, the thickness of the first and second gloss-adjusting layers 5 and 6 is preferably 1 µm or more and 15 µm or less. Moreover, the first and second gloss-adjusting layers 5 and 6 are layers on the outermost surface of the decorative material 1, and are thus required to have surface physical properties, such as abrasion resistance, scratch resistance, solvent resistance, and contamination resistance, which are required for the decorative material 1. Of these properties, abrasion resistance and scratch resistance are influenced by the thickness, and a higher thickness is advantageous. Therefore, the thickness of the first and second gloss-adjusting layers 5 and 6 is more preferably 2 µm or more and 12 µm or less. If the thickness is less than 1 µm, abrasion resistance and scratch resistance are significantly reduced; thus, the use as the decorative material 1 may be limited. In contrast, if the thickness is more than 15 µm, the flexibility of the first and second gloss-adjusting layers 5 and 6 themselves is reduced; thus, the workability as the decorative material 1 may be deteriorated.

As a method for adjusting the thickness of the first and the second gloss-adjusting layers 5 and 6, for example, the coating amount may be adjusted in the above printing methods and coating methods. The coating amount can be calculated by producing a product in which the gloss-adjusting layers 5 and 6 are formed on the substrate 2, and a product in which these layers are not formed in the various printing methods and coating methods, and determining the coating amount from their mass difference.

Furthermore, in order to impart various functions, functional additives, such as an antimicrobial agent and an antifungal agent, may be added to the first and second gloss-adjusting layers 5 and 6. Moreover, an ultraviolet absorber and a light stabilizer may be added, if necessary. Examples of ultraviolet absorbers include benzotriazole-based ultraviolet absorbers, benzoate-based ultraviolet absorbers, benzophenone-based ultraviolet absorbers, and triazine-based ultraviolet absorbers. Moreover, examples of light stabilizers include hindered amine-based light stabilizers. Furthermore, when contamination control performance and Sellotape (registered trademark) mold-release characteristics are required, a release agent having a silicone skeleton can be added. In this case, the type of release agent is not limited; however, the use of a silicone release agent having an end functional group that is reactive with the resin composition can improve contamination control performance and the durability of Sellotape mold-release characteristics.

(Transparent Resin Layer)

In particular, when abrasion resistance is required as a characteristic of the decorative material 1, a transparent resin layer (not shown) can be provided between the pattern ink layer 4 and the first gloss-adjusting layer 5. As the transparent resin layer, for example, a resin composition comprising an olefin-based resin as a main component is preferably used. Examples of the olefin-based resin include polypropylene, polyethylene, and polybutene; as well as those obtained by homopolymerization or copolymerization of two or more α-olefins (e.g., propylene, 1-butene, 1-pentene, 1-hexene, 1-heptene, 1-octene, 1-nonene, 1-decene, 1-undecene, 1-dodecene, tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-pentene, 4-ethyl-1-hexene, 3-ethyl-1-hexene, 9-methyl-1-decene, 11-methyl-1-dodecene, and 12-ethyl-1-tetradecene); and those obtained by copolymerization of ethylene or α-olefins with other monomers, such as an ethylene-vinyl acetate copolymer, an ethylene-vinyl alcohol copolymer, an ethylene-methyl methacrylate copolymer, an ethylene-ethyl methacrylate copolymer, an ethylene-butyl methacrylate copolymer, an ethylene-methyl acrylate copolymer, an ethylene-ethyl acrylate copolymer, and an ethylene-butyl acrylate copolymer. In particular, in order to further improve surface strength, highly crystalline polypropylene is preferably used.

Furthermore, the transparent resin layer may contain additives, such as a heat stabilizer, an ultraviolet absorber, a light stabilizer, an antiblocking agent, a catalyst scavenger, and a coloring agent. These additives can be suitably selected from known additives. The transparent resin layer can be formed by various lamination methods, such as a method using thermal pressure, an extrusion lamination method, and a dry lamination method.

(Effects and Others)

(1) As described above, in the decorative material 1 of the present embodiment, the resin component that constitutes the first gloss-adjusting layer 5 is a mixture of a urethane-based thermosetting resin having a polyol and an isocyanate, and an ionizing radiation-curable resin having an acrylic group or a methacrylic group; and in the resin component that constitutes the first gloss-adjusting layer 5, the urethane-based thermosetting resin is contained in an amount of 3 parts by mass or more and 100 parts by mass or less relative to 100 parts by mass of the ionizing radiation-curable resin. Accordingly, the resin component of the first gloss-adjusting layer 5 is a dual-curing type resin component combining a urethane-based thermosetting resin and an ionizing radiation-curable resin, and the amount of the urethane-based thermosetting resin is set within an optimal range, whereby while achieving a minimum cured state during lamination of the second gloss-adjusting layer 6, a high degree of crosslinking specific to the ionizing radiation-curable resin can be achieved after production of the decorative material 1; consequently, higher scratch resistance can be obtained. This makes it possible to provide a decorative material 1 having higher scratch resistance while preventing defects generated during lamination of the second gloss-adjusting layer 6.

(2) Moreover, in the decorative material 1 of the present embodiment, the resin component that constitutes the second gloss-adjusting layer 6 is a mixture of a urethane-based thermosetting resin having a polyol and an isocyanate, and an ionizing radiation-curable resin having an acrylic group or a methacrylic group; and in the resin component that constitutes the second gloss-adjusting layer 6, the urethane-based thermosetting resin is contained in an amount of 25 parts by mass or less relative to 100 parts by mass of the ionizing radiation-curable resin. Accordingly, the amount of the urethane-based thermosetting resin added is set within an optimal range, thereby providing a decorative material 1 having more excellent scratch resistance and satisfying required quality relating to workability.

(3) Moreover, in the decorative material 1 of the present embodiment, the ionizing radiation-curable resin having an acrylic group or a methacrylic group has a number average molecular weight of 300 or more and 5000 or less. Therefore, the degree of crosslinking of the resin component in the gloss-adjusting layer can be sufficiently increased, thereby providing a decorative material 1 having higher scratch resistance.

(4) Moreover, in the decorative material 1 of the present embodiment, the ionizing radiation-curable resin having an acrylic group or a methacrylic group has a number average molecular weight of 300 or more and 1500 or less. Therefore, the viscosity of the ionizing radiation-curable resin can be reduced. In addition, when ink for forming a gloss-adjusting layer is prepared, the solids concentration can be improved with the same viscosity; thus, the stability of the ink itself and the coating state can be improved.

(5) Moreover, in the decorative material 1 of the present embodiment, the design pattern of the pattern ink layer 4 is synchronized with the gloss of the second gloss-adjusting layer 6. Thus, the designability due to the second gloss-adjusting layer 6 can be added to the designability due to the pattern ink layer 4, so that a decorative material 1 having a high-grade design expression close to natural wood or the like can be formed. (6) Furthermore, in the decorative material 1 of the present embodiment, a matting agent comprising an inorganic material having a high matting effect is used. Therefore, the gloss of the gloss-adjusting layer can be significantly reduced. Accordingly, the difference between the gloss of the first gloss-adjusting layer 5 and the gloss of the second gloss-adjusting layer 6 can be increased, and the feeling of unevenness obtained can be enhanced. An excellent design expression of greater depth can be thereby achieved.

(Modification)

Figure 2:
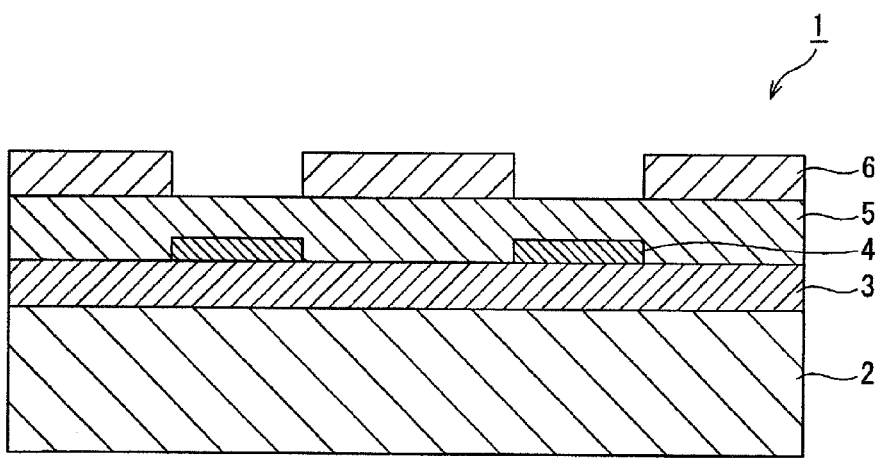
FIG. 2 is a cross-sectional view showing a modification of the decorative material.

(1) The present embodiment shows an example in which the second gloss-adjusting layer 6 is formed in a region of the first gloss-adjusting layer 5 overlapping the pattern ink layer 4, and the design pattern of the pattern ink layer 4 is synchronized with the gloss of the second gloss-adjusting layer 6; however, other structures can also be employed. For example, as shown in FIG. 2, the second gloss-adjusting layer 6 may be formed in a region of the first gloss-adjusting layer 5 other than directly above the pattern ink layer 4, and the design pattern of the pattern ink layer 4 may be synchronized with the gloss of the first gloss-adjusting layer 5. The gloss of the exposed first gloss-adjusting layer 5 is thereby imparted to the design pattern of the pattern ink layer 4, so that the designability due to the first gloss-adjusting layer 5 can be added to the designability due to the pattern ink layer 4. Therefore, it is possible to form a decorative material 1 having a high-grade design expression close to that of natural wood or the like. Moreover, the second gloss-adjusting layer 6 may be integrally formed in a region of the first gloss-adjusting layer 5 other than a region directly above the pattern ink layer 4 and part of the region directly above the pattern ink layer 4. Even with this form, the gloss of the exposed first gloss-adjusting layer 5 is imparted to the design pattern of the pattern ink layer 4, so that the designability due to the first gloss-adjusting layer 5 can be added to the designability due to the pattern ink layer 4.

(2) Furthermore, in the example shown above, the resin component that constitutes the second gloss-adjusting layer 6 is a mixture of a urethane-based thermosetting resin having a polyol and an isocyanate, and an ionizing radiation-curable resin having an acrylic group or a methacrylic group; however, other structures may also be employed. For example, the resin component that constitutes the second gloss-adjusting layer 6 may be only an ionizing radiation-curable resin having an acrylic group or a methacrylic group. The scratch resistance of the second gloss-adjusting layer 6 can be thereby improved.

EXAMPLES

Specific Examples of the decorative material 1 according to the present embodiment are described below.

Example 1

In Example 1, impregnated paper having a basis weight of 50 g/m2 (GFR-506, produced by Kohjin Co., Ltd.) was used as a substrate 2. Then, a base solid ink layer 3 and a pattern ink layer 4 were formed in this order on one side of the substrate 2 using oily nitrocellulose resin gravure printing ink (each color of PCNT (PCRNT), produced by Toyo Ink Co., Ltd.). The design pattern of the pattern ink layer 4 was a wood grain pattern.

Subsequently, ink for a first gloss-adjusting layer 5 was applied (coated) to the substrate 2, on which the pattern ink layer 4 was formed, so as to cover the entire surface of one side of the substrate 2, thereby forming the first gloss-adjusting layer 5. The ink was composed of a two-part urethane-based thermosetting resin having 2.4 parts by mass of acrylic polyol (6KW-700, produced by Taisei Fine Chemical Co., Ltd.) and 0.6 parts by mass of polyisocyanate (UR190B curing agent, produced by Toyo Ink Co., Ltd.) (3 parts by mass in total), 10 parts by mass of silica-based matting agent (Mizukasil P-803, produced by Mizusawa Industrial Chemicals, Ltd.), and 5 parts by mass of UV radical initiator (IRGACURE 184, produced by BASF), relative to 100 parts by mass of the ionizing radiation-curable resin (dipentaerythritol hexaacrylate). The coating amount of the ink was set to 5 g/m2.

Subsequently, ink for a second gloss-adjusting layer 6 was applied (coated) to a portion of the first gloss-adjusting layer 5 directly above the pattern ink layer 4, without applying ionizing radiation to the resin component (ionizing radiation-curable resin) constituting the first gloss-adjusting layer 5, thereby forming the second gloss-adjusting layer 6. The ink was composed of 5 parts by mass of silica-based matting agent (Mizukasil P-803, produced by Mizusawa Industrial Chemicals, Ltd.) and 5 parts by mass of UV radical initiator (IRGACURE 184, produced by BASF) relative to 100 parts by mass of the ionizing radiation-curable resin (dipentaerythritol hexaacrylate). Then, the decorative material 1 obtained in the above manner was irradiated with ionizing radiation to perform crosslinking and curing of the ionizing radiation-curable resin in the first and second gloss-adjusting layers 5 and 6, further followed by heat curing.

Example 2

In Example 2, the ink for the first gloss-adjusting layer 5 was composed of a two-part urethane-based thermosetting resin having 8 parts by mass of acrylic polyol (6KW-700, produced by Taisei Fine Chemical Co., Ltd.) and 2 parts by mass of polyisocyanate (UR190B curing agent, produced by Toyo Ink Co., Ltd.) (10 parts by mass in total), 10 parts by mass of silica-based matting agent (Mizukasil P-803, produced by Mizusawa Industrial Chemicals, Ltd.), and 5 parts by mass of UV radical initiator (IRGACURE 184, produced by BASF), relative to 100 parts by mass of the ionizing radiation-curable resin (dipentaerythritol hexaacrylate). Other configurations were the same as those of Example 1.

Example 3

In Example 3, the ink for the first gloss-adjusting layer 5 was composed of a two-part urethane-based thermosetting resin having 16 parts by mass of acrylic polyol (6KW-700, produced by Taisei Fine Chemical Co., Ltd.) and 4 parts by mass of polyisocyanate (UR190B curing agent, produced by Toyo Ink Co., Ltd.) (20 parts by mass in total), 10 parts by mass of silica-based matting agent (Mizukasil P-803, produced by Mizusawa Industrial Chemicals, Ltd.), and 5 parts by mass of UV radical initiator (IRGACURE 184, produced by BASF), relative to 100 parts by mass of the ionizing radiation-curable resin (dipentaerythritol hexaacrylate). Other configurations were the same as those of Example 1.

Example 4

In Example 4, the ink for the first gloss-adjusting layer 5 was composed of a two-part urethane-based thermosetting resin having 40 parts by mass of acrylic polyol (6KW-700, produced by Taisei Fine Chemical Co., Ltd.) and 10 parts by mass of polyisocyanate (UR190B curing agent, produced by Toyo Ink Co., Ltd.) (50 parts by mass in total), 10 parts by mass of silica-based matting agent (Mizukasil P-803, produced by Mizusawa Industrial Chemicals, Ltd.), and 5 parts by mass of UV radical initiator (IRGACURE 184, produced by BASF), relative to 100 parts by mass of the ionizing radiation-curable resin (dipentaerythritol hexaacrylate). Other configurations were the same as those of Example 1.

Example 5

In Example 5, the ink for the first gloss-adjusting layer 5 was composed of a two-part urethane-based thermosetting resin having 80 parts by mass of acrylic polyol (6KW-700, produced by Taisei Fine Chemical Co., Ltd.) and 20 parts by mass of polyisocyanate (UR190B curing agent, produced by Toyo Ink Co., Ltd.) (100 parts by mass in total), 10 parts by mass of silica-based matting agent (Mizukasil P-803, produced by Mizusawa Industrial Chemicals, Ltd.), and 5 parts by mass of UV radical initiator (IRGACURE 184, produced by BASF), relative to 100 parts by mass of the ionizing radiation-curable resin (dipentaerythritol hexaacrylate). Other configurations were the same as those of Example 1.

Example 6

In Example 6, the ink for the second gloss-adjusting layer 6 was composed of a two-part urethane-based thermosetting resin having 20 parts by mass of acrylic polyol (6KW-700, produced by Taisei Fine Chemical Co., Ltd.) and 5 parts by mass of polyisocyanate (UR190B curing agent, produced by Toyo Ink Co., Ltd.) (25 parts by mass in total), 5 parts by mass of silica-based matting agent (Mizukasil P-803, produced by Mizusawa Industrial Chemicals, Ltd.), and 5 parts by mass of UV radical initiator (IRGACURE 184, produced by BASF), relative to 100 parts by mass of the ionizing radiation-curable resin (dipentaerythritol hexaacrylate). Other configurations were the same as those of Example 1.

Example 7

In Example 7, the ink for the first gloss-adjusting layer 5 was composed of a two-part urethane-based thermosetting resin having 8 parts by mass of acrylic polyol (6KW-700, produced by Taisei Fine Chemical Co., Ltd.) and 2 parts by mass of polyisocyanate (UR190B curing agent, produced by Toyo Ink Co., Ltd.) (10 parts by mass in total), 10 parts by mass of silica-based matting agent (Mizukasil P-803, produced by Mizusawa Industrial Chemicals, Ltd.), and 5 parts by mass of UV radical initiator (IRGACURE 184, produced by BASF), relative to 100 parts by mass of the ionizing radiation-curable resin (dipentaerythritol hexaacrylate). Other configurations were the same as those of Example 6.

Example 8

In Example 8, the ink for the first gloss-adjusting layer 5 was composed of a two-part urethane-based thermosetting resin having 40 parts by mass of acrylic polyol (6KW-700, produced by Taisei Fine Chemical Co., Ltd.) and 10 parts by mass of polyisocyanate (UR190B curing agent, produced by Toyo Ink Co., Ltd.) (50 parts by mass in total), 10 parts by mass of silica-based matting agent (Mizukasil P-803, produced by Mizusawa Industrial Chemicals, Ltd.), and 5 parts by mass of UV radical initiator (IRGACURE 184, produced by BASF), relative to 100 parts by mass of the ionizing radiation-curable resin (dipentaerythritol hexaacrylate). Other configurations were the same as those of Example 6.

Example 9

In Example 9, the ink for the first gloss-adjusting layer 5 was composed of a two-part urethane-based thermosetting resin having 80 parts by mass of acrylic polyol (6KW-700, produced by Taisei Fine Chemical Co., Ltd.) and 20 parts by mass of polyisocyanate (UR190B curing agent, produced by Toyo Ink Co., Ltd.) (100 parts by mass in total), 10 parts by mass of silica-based matting agent (Mizukasil P-803, produced by Mizusawa Industrial Chemicals, Ltd.), and 5 parts by mass of UV radical initiator (IRGACURE 184, produced by BASF), relative to 100 parts by mass of the ionizing radiation-curable resin (dipentaerythritol hexaacrylate). Other configurations were the same as those of Example 6.

Example 10

In Example 10, the ink for the second gloss-adjusting layer 6 was composed of a two-part urethane-based thermosetting resin having 2.4 parts by mass of acrylic polyol (6KW-700, produced by Taisei Fine Chemical Co., Ltd.) and 0.6 parts by mass of polyisocyanate (UR190B curing agent, produced by Toyo Ink Co., Ltd.) (3 parts by mass in total), 5 parts by mass of silica-based matting agent (Mizukasil P-803, produced by Mizusawa Industrial Chemicals, Ltd.), and 5 parts by mass of UV radical initiator (IRGACURE 184, produced by BASF), relative to 100 parts by mass of the ionizing radiation-curable resin (dipentaerythritol hexaacrylate). Other configurations were the same as those of Example 1.

Example 11

In Example 11, the ink for the first gloss-adjusting layer 5 was composed of a two-part urethane-based thermosetting resin having 8 parts by mass of acrylic polyol (6KW-700, produced by Taisei Fine Chemical Co., Ltd.) and 2 parts by mass of polyisocyanate (UR190B curing agent, produced by Toyo Ink Co., Ltd.) (10 parts by mass in total), 10 parts by mass of silica-based matting agent (Mizukasil P-803, produced by Mizusawa Industrial Chemicals, Ltd.), and 5 parts by mass of UV radical initiator (IRGACURE 184, produced by BASF), relative to 100 parts by mass of the ionizing radiation-curable resin (dipentaerythritol hexaacrylate). Other configurations were the same as those of Example 10.

Example 12

In Example 12, the ink for the first gloss-adjusting layer 5 was composed of a two-part urethane-based thermosetting resin having 40 parts by mass of acrylic polyol (6KW-700, produced by Taisei Fine Chemical Co., Ltd.) and 10 parts by mass of polyisocyanate (UR190B curing agent, produced by Toyo Ink Co., Ltd.) (50 parts by mass in total), 10 parts by mass of silica-based matting agent (Mizukasil P-803, produced by Mizusawa Industrial Chemicals, Ltd.), and 5 parts by mass of UV radical initiator (IRGACURE 184, produced by BASF), relative to 100 parts by mass of the ionizing radiation-curable resin (dipentaerythritol hexaacrylate). Other configurations were the same as those of Example 10.

Example 13

In Example 13, the ink for the first gloss-adjusting layer 5 was composed of a two-part urethane-based thermosetting resin having 80 parts by mass of acrylic polyol (6KW-700, produced by Taisei Fine Chemical Co., Ltd.) and 20 parts by mass of polyisocyanate (UR190B curing agent, produced by Toyo Ink Co., Ltd.) (100 parts by mass in total), 10 parts by mass of silica-based matting agent (Mizukasil P-803, produced by Mizusawa Industrial Chemicals, Ltd.), and 5 parts by mass of UV radical initiator (IRGACURE 184, produced by BASF), relative to 100 parts by mass of the ionizing radiation-curable resin (dipentaerythritol hexaacrylate). Other configurations were the same as those of Example 10.

Example 14

In Example 14, the ink for the first gloss-adjusting layer 5 was composed of a two-part urethane-based thermosetting resin having 40 parts by mass of acrylic polyol (6KW-700, produced by Taisei Fine Chemical Co., Ltd.) and 10 parts by mass of polyisocyanate (UR190B curing agent, produced by Toyo Ink Co., Ltd.) (50 parts by mass in total), 10 parts by mass of silica-based matting agent (Mizukasil P-803, produced by Mizusawa Industrial Chemicals, Ltd.), and 5 parts by mass of UV radical initiator (IRGACURE 184, produced by BASF), relative to 100 parts by mass of the ionizing radiation-curable resin (dipentaerythritol hexaacrylate). Moreover, the ink for the second gloss-adjusting layer 6 was composed of a two-part urethane-based thermosetting resin having 24 parts by mass of acrylic polyol (6KW-700, produced by Taisei Fine Chemical Co., Ltd.) and 6 parts by mass of polyisocyanate (UR190B curing agent, produced by Toyo Ink Co., Ltd.) (30 parts by mass in total), 5 parts by mass of silica-based matting agent (Mizukasil P-803, produced by Mizusawa Industrial Chemicals, Ltd.), and 5 parts by mass of UV radical initiator (IRGACURE 184, produced by BASF), relative to 100 parts by mass of the ionizing radiation-curable resin (dipentaerythritol hexaacrylate). Other configurations were the same as those of Example 1.

Comparative Example 1

In Comparative Example 1, the ink for the first gloss-adjusting layer 5 was composed of a two-part urethane-based thermosetting resin having 0.8 parts by mass of acrylic polyol (6KW-700, produced by Taisei Fine Chemical Co., Ltd.) and 0.2 parts by mass of polyisocyanate (UR190B curing agent, produced by Toyo Ink Co., Ltd.) (1 part by mass in total), 10 parts by mass of silica-based matting agent (Mizukasil P-803, produced by Mizusawa Industrial Chemicals, Ltd.), and 5 parts by mass of UV radical initiator (IRGACURE 184, produced by BASF), relative to 100 parts by mass of the ionizing radiation-curable resin (dipentaerythritol hexaacrylate) Other configurations were the same as those of Example 1.

Comparative Example 2

In Comparative Example 2, the ink for the first gloss-adjusting layer 5 was composed of a two-part urethane-based thermosetting resin having 120 parts by mass of acrylic polyol (6KW-700, produced by Taisei Fine Chemical Co., Ltd.) and 30 parts by mass of polyisocyanate (UR190B curing agent, produced by Toyo Ink Co., Ltd.) (150 parts by mass in total), 10 parts by mass of silica-based matting agent (Mizukasil P-803, produced by Mizusawa Industrial Chemicals, Ltd.), and 5 parts by mass of UV radical initiator (IRGACURE 184, produced by BASF), relative to 100 parts by mass of the ionizing radiation-curable resin (dipentaerythritol hexaacrylate). Other configurations were the same as those of Example 1.

(Evaluation)

Examples 1 to 14 and Comparative Examples 1 and 2 above were evaluated for scratch resistance and the generation of defects during continuous coating of the first and second gloss-adjusting layers 5 and 6.

(Defects During Continuous Coating)

The presence of defects during lamination of the second gloss-adjusting layer 6 was evaluated by visual observation from the condition during lamination of the second gloss-adjusting layer 6 and the appearance of the produced decorative material 1. When there were no defects, this case was evaluated as "++"; when dissolution and scraping were slightly observed in the first gloss-adjusting layer 5, and there were slight defects, this case was evaluated as "+"; and when dissolution and scraping were clearly observed in the first gloss-adjusting layer 5, and there were defects, this case was evaluated as "−."

(Scratch Resistance)

After each decorative material 1 was subjected to a scratch resistance test in which steel wool (#0000) is caused to reciprocate 10 times at a load of 500 [g/m2], the presence of scratches and glossiness changes on the surface of the decorative material 1 were evaluated by visual observation. When neither scratches nor glossiness changes were observed, this case was evaluated as "++"; when scratches and glossiness changes were slightly observed, this case was evaluated as "+"; and when large scratches and glossiness changes were observed, this case was evaluated as "−."

TABLE 1

|  | First gloss-adjusting layer | | Second gloss-adjusting layer | | | |
| --- | --- | --- | --- | --- | --- | --- |
|  | Ionizing radiation-curable resin | Urethane-based thermosetting resin | Ionizing radiation-curable resin | Urethane-based thermosetting resin | Defects during Continuous Coating | Scratch resistance |
| Example 1 | 100 parts by mass | 3 parts by mass | 100 parts by mass | 0 parts by mass | + | ++ |
| Example 2 | 100 parts by mass | 10 parts by mass | 100 parts by mass | 0 parts by mass | ++ | ++ |
| Example 3 | 100 parts by mass | 20 parts by mass | 100 parts by mass | 0 parts by mass | ++ | ++ |
| Example 4 | 100 parts by mass | 50 parts by mass | 100 parts by mass | 0 parts by mass | ++ | ++ |
| Example 5 | 100 parts by mass | 100 parts by mass | 100 parts by mass | 0 parts by mass | ++ | + |
| Example 6 | 100 parts by mass | 3 parts by mass | 100 parts by mass | 25 parts by mass | + | ++ |
| Example 7 | 100 parts by mass | 10 parts by mass | 100 parts by mass | 25 parts by mass | ++ | ++ |
| Example 8 | 100 parts by mass | 50 parts by mass | 100 parts by mass | 25 parts by mass | ++ | ++ |
| Example 9 | 100 parts by mass | 100 parts by mass | 100 parts by mass | 25 parts by mass | ++ | + |
| Example 10 | 100 parts by mass | 3 parts by mass | 100 parts by mass | 3 parts by mass | + | ++ |
| Example 11 | 100 parts by mass | 10 parts by mass | 100 parts by mass | 3 parts by mass | ++ | ++ |
| Example 12 | 100 parts by mass | 50 parts by mass | 100 parts by mass | 3 parts by mass | ++ | ++ |
| Example 13 | 100 parts by mass | 100 parts by mass | 100 parts by mass | 3 parts by mass | ++ | + |
| Example 14 | 100 parts by mass | 50 parts by mass | 100 parts by mass | 30 parts by mass | ++ | + |
| Comparative Example 1 | 100 parts by mass | 1 part by mass | 100 parts by mass | 0 parts by mass | − | ++ |
| Comparative Example 2 | 100 parts by mass | 150 parts by mass | 100 parts by mass | 0 parts by mass | ++ | − |

With the decorative materials 1 of Examples 1 to 14, both the defects during continuous coating and the scratch resistance were evaluated as "++" or "+," as shown in Table 1.

The reason that the scratch resistance of the decorative material 1 of Example 14 was lower than the scratch resistance of the decorative material 1 of Example 8 is considered to be that the ratio of the urethane-based thermosetting resin in the second gloss-adjusting layer 6 exceeded 25 parts by mass, and that due to the higher ratio of the urethane-based thermosetting resin, the degree of crosslinking of the resin composition was reduced, and the scratch resistance of the second gloss-adjusting layer 6 was reduced.

In contrast, with the decorative material 1 of Comparative Example 1, the scratch resistance was evaluated as "+"; however, the defects during continuous coating were evaluated as "-." The reason that the defects during continuous coating were evaluated as "-" is considered to be that due to the overly low ratio of the urethane-based thermosetting resin in the first gloss-adjusting layer 5, defects, such as dissolution and scraping of the first gloss-adjusting layer 5 during lamination of the second gloss-adjusting layer 6, easily occurred. In Comparative Example 2, the defects during continuous coating were evaluated as "++"; however, the scratch resistance was evaluated as "-." The reason that the scratch resistance was evaluated as "-" is considered to be that due to the overly high ratio of the urethane-based thermosetting resin, the degree of crosslinking of the resin composition was reduced, and the scratch resistance of the first gloss-adjusting layer 5 was reduced.

The above results revealed that the decorative materials 1 of Examples 1 to 14, in which the amount of the urethane-based thermosetting resin, which was a resin component constituting the first gloss-adjusting layer 5, was set within an optimal range, had excellent scratch resistance while preventing defects generated during lamination of the second gloss-adjusting layer 6.

The decorative material 1 of the present invention is not limited to the above embodiments and Examples, and various modifications can be made within a range that does not impair the features of the invention.

REFERENCE SIGNS LIST

1 . . . Decorative material; 2 . . . Substrate; 3 . . . Base solid ink layer; 4 . . . Pattern ink layer; 5 . . . First gloss-adjusting layer; 6 . . . Second gloss-adjusting layer.

What is claimed is:

1. A decorative material comprising:
a first gloss-adjusting layer provided on a substrate, and
a second gloss-adjusting layer partially provided on the first gloss-adjusting layer, and having gloss that is different from that of the first gloss-adjusting layer;
wherein a resin component that constitutes the first gloss-adjusting layer is a mixture of a urethane-based thermosetting resin having a polyol and an isocyanate, and an ionizing radiation-curable resin having an acrylic group or a methacrylic group;
the urethane-based thermosetting resin is contained in the first gloss-adjusting layer in an amount within a range of 3 parts by mass or more and 100 parts by mass or less relative to 100 parts by mass of the ionizing radiation-curable resin of the first gloss-adjusting layer;
a resin component that constitutes the second gloss-adjusting layer is a mixture of a urethane-based thermosetting resin having a polyol and an isocyanate, and an ionizing radiation-curable resin having an acrylic group or a methacrylic group; and the urethane-based thermosetting resin is contained in the second gloss-adjusting layer in an amount within a range of more than 0 parts by mass and 25 parts by mass or less relative to 100 parts by mass of the ionizing radiation-curable resin of the second gloss-adjusting layer.

2. The decorative material of claim 1, wherein in the first gloss-adjusting layer the ionizing radiation-curable resin having an acrylic group or a methacrylic group has a number average molecular weight within a range of 300 or more and 5000 or less.

3. The decorative material of claim 2, wherein in the first gloss-adjusting layer the ionizing radiation-curable resin having an acrylic group or a methacrylic group has a number average molecular weight within a range of 300 or more and 1500 or less.

4. The decorative material of claim 1, wherein the decorative material further comprises a pattern ink layer provided between the substrate and the first gloss-adjusting layer;
the second gloss-adjusting layer is formed in a region of the first gloss-adjusting layer, the region of the first gloss-adjusting layer overlapping the pattern ink layer; and
a pattern of the pattern ink layer is synchronized with the gloss of the second gloss-adjusting layer.

5. The decorative material of claim 1, wherein the decorative material further comprises a pattern ink layer provided between the substrate and the first gloss-adjusting layer;
the first gloss-adjusting layer entirely covers a surface of the substrate on a first gloss-adjusting layer side;
the second gloss-adjusting layer is formed in a region of the first gloss-adjusting layer other than a region directly above the pattern ink layer; and
a pattern of the pattern ink layer is synchronized with the gloss of the first gloss-adjusting layer.

6. The decorative material of claim 1, wherein the decorative material further comprises a pattern ink layer provided between the substrate and the first gloss-adjusting layer;
the second gloss-adjusting layer is formed so as to partially overlap the pattern ink layer; and
a pattern of the pattern ink layer is synchronized with the gloss of the second gloss-adjusting layer.

7. The decorative material of claim 1, wherein the decorative material further comprises a pattern ink layer provided between the substrate and the first gloss-adjusting layer;
the second gloss-adjusting layer is integrally formed in a region of the first gloss-adjusting layer directly above the pattern ink layer, and in part of a region of the first gloss-adjusting layer other than the region directly above the pattern ink layer; and
a pattern of the pattern ink layer is synchronized with the gloss of the second gloss-adjusting layer.

8. The decorative material of claim 1, wherein the decorative material further comprises a pattern ink layer provided between the substrate and the first gloss-adjusting layer;
the first gloss-adjusting layer entirely covers a surface of the substrate on a first gloss-adjusting layer side;
the second gloss-adjusting layer is integrally formed in a region of the first gloss-adjusting layer other than a region directly above the pattern ink layer, and in part of the region of the first gloss-adjusting layer directly above the pattern ink layer; and
a pattern of the pattern ink layer is synchronized with the gloss of the first gloss-adjusting layer.

9. The decorative material of claim 1, wherein
at least one of the first gloss-adjusting layer and the second gloss-adjusting layer contains a matting agent; and
the matting agent comprises an inorganic material.

\* \* \* \* \*